United States Patent
Mino et al.

[11] Patent Number: 5,900,566
[45] Date of Patent: May 4, 1999

[54] KARAOKE PLAYBACK APPARATUS UTILIZING DIGITAL MULTI-CHANNEL BROADCASTING

[75] Inventors: Hiroshi Mino, Hoya; Masao Toyosawa, Tokyo, both of Japan

[73] Assignee: Daiichi Kosho Co., Ltd., Japan

[21] Appl. No.: 08/920,635

[22] Filed: Aug. 29, 1997

[30] Foreign Application Priority Data

Aug. 30, 1996 [JP] Japan .................................. 8-230404

[51] Int. Cl.⁶ .............................. G10H 1/36; G10H 7/00
[52] U.S. Cl. .............................. 84/610; 84/634; 84/650; 434/307 A
[58] Field of Search .................... 84/609–613, 634–637, 84/649–652; 434/307 A

[56] References Cited

U.S. PATENT DOCUMENTS 5,689,081  11/1997  Tsurumi ..................................... 84/609
5,774,672  6/1998  Funahashi et al. ................. 395/200.61

FOREIGN PATENT DOCUMENTS 2730358  6/1993  Japan .

*Primary Examiner*—William M. Shoop, Jr.
*Assistant Examiner*—Marlon T. Fletcher
*Attorney, Agent, or Firm*—Barnes & Thournburg

[57] ABSTRACT

A karaoke playback apparatus and system capable of substantially improving quality of background image services by making use of a digital multi-channel broadcasting are disclosed.

A karaoke playback apparatus according to one aspect of the present invention includes a data memory 2 for storing karaoke data transmitted via a telephone network, a sound processor 4 for generating audio signal of an accompaniment sound according to the karaoke data read out from the data memory 2 to be output via a speaker 7, an image processor 8 for controlling display of lyrics contained in the karaoke data in synchronism with processing of the accompaniment sound to be displayed via a monitor 10, a receiver 12 of a digital multi-channel television broadcasting for receiving a plurality of channels on which background images for karaoke musical pieces are broadcasted, and a background controller 14 for controlling the receiver 12 of the broadcasting. Each of the karaoke musical pieces has an identifier and a predetermined background selector appended thereto. When a request is made to play back a karaoke musical piece, the background selector of the karaoke data read out from the data memory 2 is picked up and supplied to the background controller 14, and the background controller 14 selects a channel from the broadcasting on which images associated with the background selector are broadcasted to supply the images on the selected channel to the monitor 10.

20 Claims, 2 Drawing Sheets

KARAOKE PLAYBACK APPARATUS UTILIZING DIGITAL MULTI-CHANNEL BROADCASTING

BACKGROUND OF THE INVENTION

1. Field of the Invention

The present invention generally relates to a karaoke playback apparatus and system in which sound of an accompaniment of a karaoke musical piece is output from a speaker and, at the same time, the text of the lyrics of the musical piece is displayed in synchronism with the progress of the accompaniment on a monitor along with appropriate background images prepared and stored separately from the sound and lyrics data. In particular, the present invention relates to a karaoke playback apparatus and system utilizing a digital multi-channel broadcasting medium such as a digital multi-channel satellite television broadcasting.

2. Description of the Related Art

The most popular communication karaoke system in recent years is the musical-piece/image separate system as is generally known, in which background images separately prepared and stored are subsequently added. Specifically, the sound of an accompaniment of a karaoke musical piece and the lyrics text of the musical piece as well as karaoke data including information for synchronizing the sound and the text are stored in and played back by a system separated from a system for storing and playing back video data serving as a background of a display of the lyrics text. When a requested piece of music is played back, background images which fit the mood and the atmosphere of the music are displayed on a monitor.

Background images are not prepared for a specific piece of music. Instead, a number of background images are classified by types of melody such as Japanese popular ballads, pops and rock 'n' roll. When a piece of music classified as a Japanese popular ballad is played back, for example, one piece of image data properly selected from among a plurality of images pertaining to Japanese popular ballads is played back to accompany the music. As an alternative, a number of short image-data pieces pertaining to Japanese popular ballads selected at random are concatenated. In this way, a very small amount of image data can be appropriately used for a number of musical pieces. As a result, the system can easily keep up with new songs introduced one after another, reducing the load of producing new image data for those songs.

Like enjoying music video or background video images, it is a big factor in enjoying karaoke to watch images displayed as a background of the lyrics text of a piece of music. In an expensive and very large karaoke playback apparatus using an optical disk for recording pieces of music and background image data for each musical piece, when a requested music is played back, specific images prepared for the music are always displayed. In the case of a karaoke playback apparatus of the musical-piece/image separate system, on the other hand, the reproduced images vary from time to time even if the same piece of music is played back. For a regular customer of karaoke, the latter apparatus is better in that a variety of background images are enjoyable. It is regarded as one of merits offered by the musical-piece/image separate system.

In the conventional communication karaoke system, the musical-piece/image separate system is adopted with the intention of reducing the burden of the image-software production and decreasing the size of the image storing/playback system employed in a karaoke playback terminal.

The communication karaoke system has been welcomed since new hit songs are readily available after their release. However, quality of the background video software as entertainment is not considered satisfying. For example, a regular karaoke customer who frequently sings new pop songs will be aware that the background images result from repeated random combination of images of the same group, and get tired of the images soon.

SUMMARY OF THE INVENTION

It is an object of the present invention to provide a karaoke playback apparatus and system including the same which are capable of substantially enhancing quality of the background image service by utilizing a digital multi-channel broadcasting in addition to merits of the conventional communication karaoke system.

In order to accomplish the above and other objects, a karaoke playback apparatus according to one aspect of the present invention comprises acoustic output means for outputting sound of an accompaniment of a karaoke musical piece and image outputting means for displaying images as a background image to which character strings representing lyrics text of the karaoke musical piece are added, karaoke data containing digital data which includes information of both an accompaniment and lyrics of a karaoke musical piece and information for synchronizing the accompaniment and the lyrics of the karaoke musical piece, each the karaoke musical piece having an identifier and a predetermined background selector appended thereto, data storage means for storing the karaoke data transmitted according to a predetermined schedule by way of communication medium. When a request is made to play back a karaoke musical piece, karaoke data for the requested karaoke musical piece is read out from the data storage means and the sound of an accompaniment and the lyrics text of the karaoke musical piece in the karaoke data with the former synchronized to the latter are played back to be output via the acoustic output means and the image outputting means, respectively. When a request is made to play back a karaoke musical piece, the background selector of the karaoke data read out from the data storage means is picked up and supplied to a background processing means. The background processing means receives a digital multi-channel broadcasting and selects a channel from the digital multi-channel broadcasting on which images associated with the background selector are broadcasted to supply the images on the selected channel to the image outputting means.

It is possible that images with sound satisfying predetermined conditions are selectively received from a digital multi-channel broadcasting and stored in image storing unit, and the images with sound are read out from the image storing unit under specific conditions and output via the image outputting means.

Moreover, the digital multi-channel broadcasting may be a satellite broadcast.

Each karaoke playback apparatus may further comprises a receiver of the digital multi-channel broadcasting.

According to another aspect of the present invention, a karaoke playback system utilizing a digital multi-channel broadcasting, comprises a plurality of karaoke playback apparatuses described above, and a common receiving facility comprising a plurality of receivers for receiving different channels of the digital multi-channel broadcasting respectively. Images on the channels received by the common receiving facility are distributed to the karaoke playback apparatuses, and one of the channels are selected to choose images by the background processing means employed in each of the karaoke playback apparatuses.

According to yet another aspect of the present invention, a karaoke playback apparatus utilizing a digital multi-channel broadcasting, comprises a data memory for storing karaoke data transmitted via a communication network, a sound processor for generating audio signal of an accompaniment sound according to the karaoke data read out from the data memory to be output via a speaker, an image processor for controlling display of lyrics contained in the karaoke data in synchronism with processing of the accompaniment sound to be displayed via a monitor, a receiver of a digital multi-channel broadcasting for receiving a plurality of channels on which background images for karaoke musical pieces are broadcasted, and a background controller for controlling the receiver of the digital multi-channel broadcasting. The karaoke data contains digital data including information of both an accompaniment and lyrics of a karaoke musical piece and information for synchronizing the accompaniment and the lyrics of the karaoke musical piece. Each the karaoke musical piece has an identifier and a predetermined background selector appended thereto. When a request is made to play back a karaoke musical piece, karaoke data for the requested karaoke musical piece is read out from the data memory and the sound of an accompaniment and the lyrics text of the karaoke musical piece in the karaoke data with the former synchronized to the latter are played back to be output via speaker and the monitor, respectively. When a request is made to play back a karaoke musical piece, the background selector of the karaoke data read out from the data memory is picked up and supplied to the background processor. The background controller selects a channel from the digital multi-channel broadcasting on which images associated with the background selector are broadcasted to supply the images on the selected channel to the monitor.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF THE PREFERRED EMBODIMENTS

Figure 1:
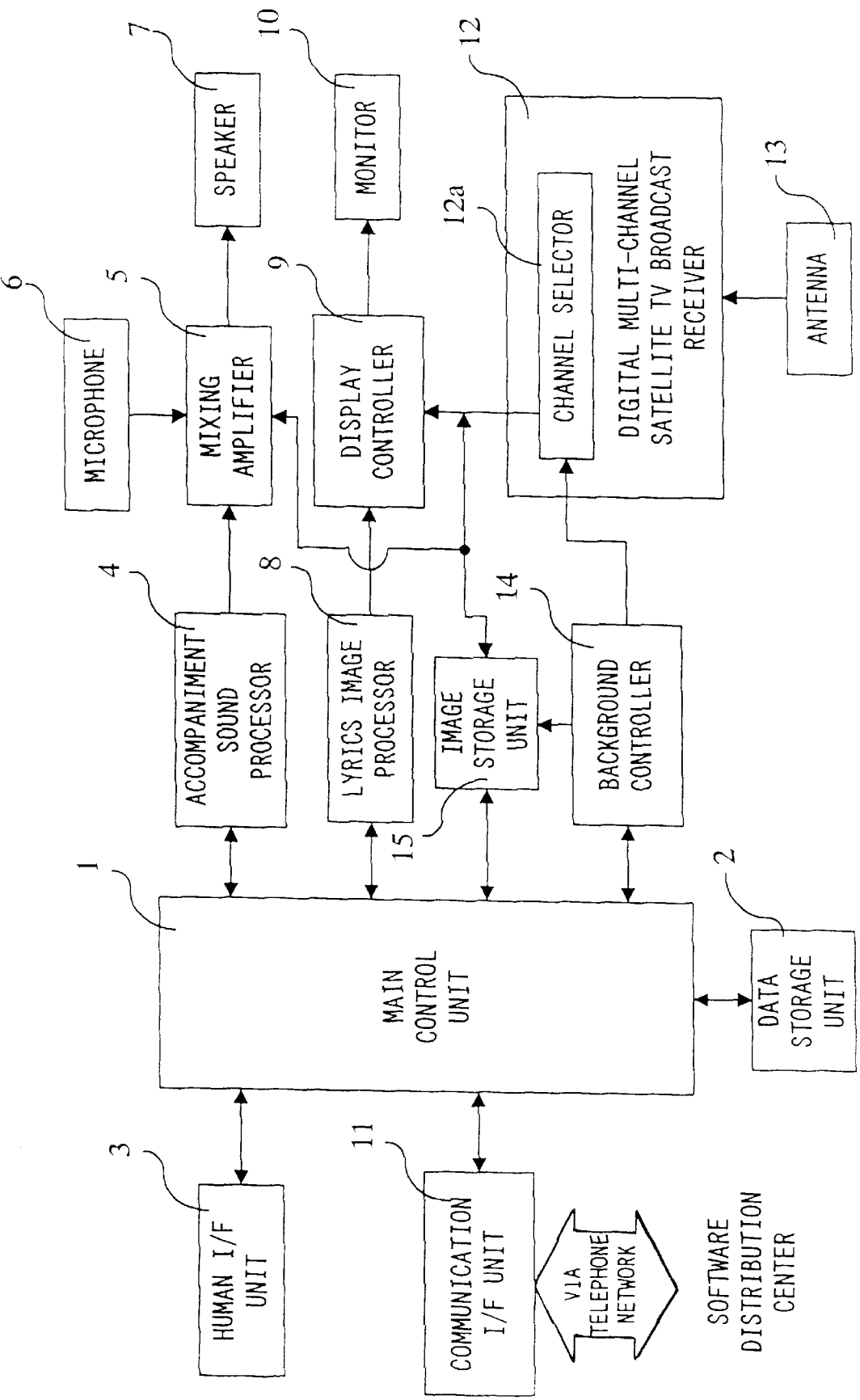
FIG. 1 shows a block diagram of a skeleton configuration of a karaoke playback apparatus implemented by the embodiment.

FIG. 1 is a diagram showing a skeleton configuration of a karaoke playback apparatus implemented by an embodiment of the present invention. As shown in the figure, a main control unit 1 is implemented by a computer main unit comprising a CPU, a RAM unit and a ROM unit as core components. A data storage unit 2 is an auxiliary storage device which is implemented by a hard-disk drive. A human interface unit 3 is an input/output means which is operated by the user for entering a variety of commands to the karaoke playback apparatus and used for displaying responses output by the karaoke playback apparatus to the user.

In the data storage unit 2, a plurality of karaoke data corresponding to a number of musical pieces are stored. The karaoke data comprises synthesis of sound data, which is typically MIDI coded accompaniment, and lyrics text data of respective musical pieces. The karaoke data also includes information for synchronizing the sound data with the lyrics text data. The karaoke data of a musical piece has the number of the musical piece appended thereto as an identifier thereof. The number of the musical piece includes the number of a melody mood which corresponds to the above-mentioned background selector.

Karaoke data is received from a software distribution center managed by a karaoke provider by way of a telephone network at proper times. In order to receive the karaoke data, the main control unit 1 is connected to the telephone network through a communication interface unit 11. The karaoke playback apparatus communicates with the software distribution center in accordance with a predetermined sequence to receive karaoke data of newly provided musical pieces and stores the karaoke data in the data storage unit 2.

When a request to playback and output a piece of music is received from a customer, the main control unit 1 accesses the data storage unit 2 in order to read out karaoke data of the requested musical piece from the data storage unit 2. The karaoke data is supplied to an accompaniment-sound processing unit 4 for generating an audio signal representing the sound of the accompaniment, which is then supplied to a mixing amplifier 5. The mixing amplifier 5 mixes a signal received from a microphone 6 and the audio signal representing the sound of the accompaniment, to amplify the mixed signal.

The amplified signal is then output from a speaker 7. In synchronization with this processing, the main control unit 1 sequentially processes the lyrics text of the musical piece included in the accompaniment-sound data in conjunction with a lyrics image processing unit 8, displaying images of character strings constituting the lyrics of the musical piece in synchronization with the playback timing of the accompaniment sound on a display unit 10 such as a CRT by way of a display control unit 9. The display unit 10 also displays background images as will be described below.

The karaoke playback apparatus implemented by the embodiment is provided with a receiver 12 for a digital multi-channel satellite television broadcasting and an antenna 13. In this embodiment, the karaoke provider broadcasts background images for use in a playback operation of karaoke musical pieces continuously for twenty four (24) hours by using predetermined ten (10) channels of the digital multi-channel satellite television broadcasting. The above channels are referred to as a karaoke-image channel, respectively.

Pieces of music handled by the karaoke playback apparatus/system are classified by such factors as mood of melody and atmosphere of the musical piece as a whole into ten (10) categories which are identified by the above-mentioned melody mood number, respectively. The ten (10) karaoke-image channels provided as services rendered through the digital multi-channel satellite television broadcasting are associated with the ten (10) melody mood numbers, respectively. Selected images suitable for the melody mood and the atmosphere of each musical piece are broadcasted continuously for twenty four (24) hours through the respective channels. Typically, images of short scenes received through a channel are concatenated at random, being produced as an output of background images.

Controlled by a background control unit 14, a channel selector 12a employed in the receiver 12 determines a channel to be received. In turn, the background control unit 14 controls the channel selector 12a in accordance with a command issued by the main control unit 1. Specifically, in an operation to playback and output karaoke data of a musical piece stored in the data storage unit 2, the main control unit 1 picks up a melody mood number included in the karaoke data of the musical pieces and supplies the melody mood number to the background control unit 14. The background control unit 14 controls and actuates the channel selector 12a in accordance with the melody mood number received from the main control unit 1, and allow the channel selector 12a to select a karaoke-image channel specified by the melody mood number. Images received by the selected karaoke-image channel are supplied to the display control unit 9 for displaying the images on the display unit 10 in the background of character strings constituting the lyrics text of the musical piece output by the lyrics image processing unit 8.

In the present embodiment, karaoke data is transmitted to the karaoke playback apparatus through the telephone network as described above. However, the karaoke data containing digital MIDI format data may be downloaded to the karaoke playback apparatus via a predetermined channel of the digital multi-channel satellite television broadcasting. In this case, the downloaded digital data is stored in the data storage unit 2 in the same way the karaoke data is transmitted via the telephone network. Furthermore, it is also possible to transfer any digital data other than the karaoke data to the karaoke playback apparatus via a predetermined channel or channels of the digital multi-channel satellite television broadcasting.

It should be noted that, in the present state, as a digital multi-channel satellite television broadcasting cited as one of the features of the karaoke playback apparatus, it seems most realistic and most practical to utilize satellite broadcasting services such as "PerfecTV™", a Japanese commercial satellite broadcasting service, trial broadcasting of which is scheduled to start in 1996 or 1997.

While the present invention has been described with reference to the illustrative embodiment wherein the control carried out by the background control unit 14 is based on a one-to-one relation between the melody mood number and the karaoke-image channel, the description is not intended to be construed in a limiting sense. That is to say, it is to be understood that the subject matter encompassed by the present invention is not limited to the simple control embraced by the embodiment. For example, a variety of applications described below are conceivable.

(a) During a temporary pause period in which no karaoke piece of music is played back, images received via an appropriate channel are displayed on the display unit 10 in accordance with a predetermined algorithm. In this case, a sound signal included in the image data from the received channel is output from the speaker 7 by way of the mixing amplifier 5.

(b) Regardless of the melody mood number of the musical piece to be played back, a channel is selected in accordance with information entered by the user via the human interface unit 3 and images received through the selected channel are displayed on the display unit 10.

(c) A plurality of channels are associated with one melody mood number. While images of the channels corresponding to the same melody mood number are properly switched from one channel to another, the images are displayed on the display unit 10.

The embodiment shown in FIG. 1 is provided with the additional function as follows. The background control unit 14 has an image storage unit 15. The background control unit 14 operates in accordance with a command issued by the main control unit 1. Specifically, the background control unit 14 controls the operation of the receiver 12 to selectively receive image data with sound signals that satisfy a specific condition from a digital multi-channel satellite television broadcasting and store the images in the image storage unit 15. The background control unit 14 also controls operations to read out image information stored in the image storage unit 15 under a specific condition and to display the information on the display unit 10 through the display control unit 9.

By using the function described above, for example, the following operations of the karaoke playback apparatus are controlled. Through a specific channel of the digital multi-channel satellite television broadcasting and during a specific time period, PR images with sound for introducing new songs created by a variety of musicians, images with sound serving for advertisement of or guidance from a karaoke provider and images of a similar kind may be broadcasted. Each of the images for PR and advertisement purposes of this type is an independent image data having several tens of seconds to several minutes of showing, and have information appended thereto for identifying the contents thereof. Pieces of identification information can be distinguished from each other by the main control unit 1 and the background control unit 14. Using the identification information as a basis, images for PR and advertisement purposes broadcasted by the digital multi-channel satellite television broadcasting are received by the receiver 12 employed in the karaoke playback apparatus shown in FIG. 1 and stored in the image storage unit 15. Then, during such idle time as the temporary pause period in which no karaoke piece of music is played back, the images with sound for PR and advertisement purposes are read out from the image storage unit 15 and displayed on the display unit 10 and the sound is output to the speaker 7.

In addition, in the case of a karaoke playback apparatus with such a function, a plurality of different images for PR and advertisement purposes can be stored in the image storage unit 15 and the identification information can be used to select arbitrary images from a number of unit images and to read out the selected images to be played back and output. When images stored in the image storage unit 15 during a playback pause period of karaoke musical pieces are played back, the melody mood numbers of karaoke musical pieces which were selected and performed immediately prior to the pause period are examined in order to select images for PR and advertisement purposes with a type matching the dominant melody mood among requests made by karaoke customers. If a number of musical pieces were requested from among the pops-melody group, for example, PR and advertisement images focused on pops fans are selected and played back. If many musical pieces pertaining to the type of Japanese popular ballads were requested, on the other hand, PR and advertisement images for fans of Japanese popular ballads are selected and played back.

Figure 2:
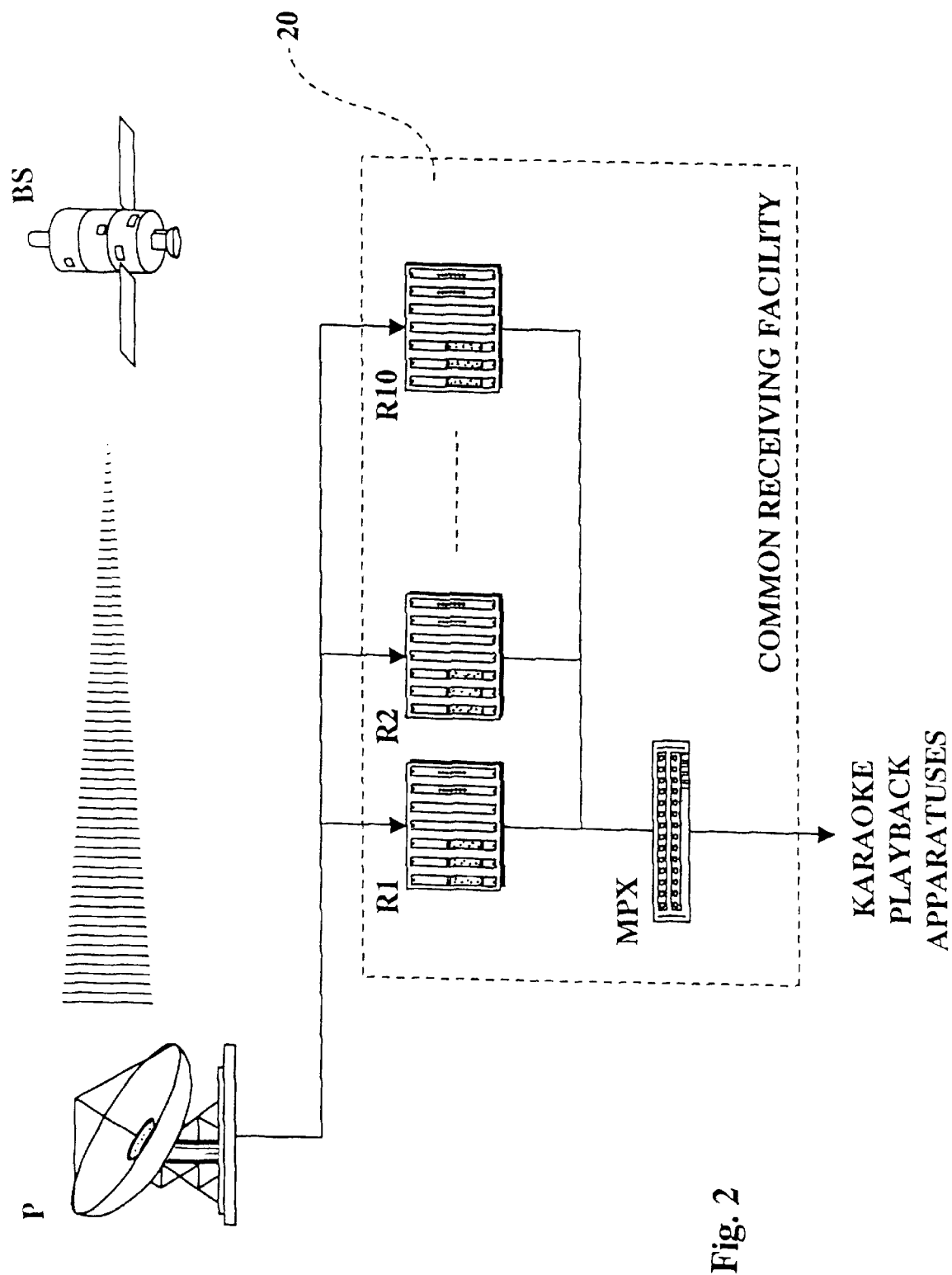
FIG. 2 is a partial schematic diagram of a karaoke playback system according to one embodiment of the present invention.

FIG. 2 shows a system comprising a plurality of karaoke playback apparatuses and a common receiving facility 20 shared by the karaoke playback apparatuses. In such a system, typically ten (10) receivers R1–R10 each for receiving images through a karaoke-image channel via a broadcast satellite BS and a parabola antenna P are provided in the common receiving facility 20. Video signals received by the receivers R1–R10 through the ten (10) karaoke-image channels are multiplexed with each other by a multiplexer MPX using the same technique as that in an ordinary cable television and a multiplexed signal is then transmitted to a plurality of karaoke playback apparatuses (not shown) via cables. Each of the karaoke playback apparatuses is provided with the same receiver as an ordinary cable television, which is capable of receiving the signals of the ten (10) karaoke-image channels. One of the ten (10) karaoke-image channels is selected and images of the selected channel are displayed under the same control as that carried out by the background control unit 14. As a whole, this system allows the cost to be reduced in comparison with a number of karaoke playback apparatuses for individually receiving a digital multi-channel satellite television broadcasting.

As described hereinbefore, according to the present invention, a number of various images can be delivered to many users in real time basis and properly combined with each other to be displayed as background images in operation of playing back a karaoke piece of music, in addition to the merit of conventional communication karaoke wherein karaoke data of new pieces of music can be delivered immediately to a number of users. In this way, according to the karaoke playback apparatus and system of the present invention, it becomes unlikely that a frequent karaoke customer who loves songs of a particular category, e.g., pop music, would be bored with repetition of the same or similar background images selected at random from images of the same group as is the case with the conventional apparatus. Furthermore, a variety of images can be effectively utilized in karaoke for making karaoke more enjoyable. Such images to be utilized for karaoke may include images of the latest news containing, for example, various sport events, previews of new movies and rejected images during production of various video products such as music video and background-video software.

While the present invention has been discussed in terms of the preferred embodiments, the present invention should be implemented in various fashions with incorporating modifications of the disclosed embodiments in addition, omission or modification of the detailed construction, without departing from the principle of the invention. Therefore, the present invention should be understood to include all embodiments encompassed within the spirit of the invention set out in the appended claims.

What is claimed is:

1. A karaoke playback apparatus utilizing two kinds of media of communication and broadcasting, comprising acoustic output means for outputting sound of an accompaniment of a karaoke musical piece and image outputting means for displaying images as a background image to which character strings representing lyrics text of said karaoke musical piece are added, karaoke data containing digital data which includes information of both an accompaniment and lyrics of a karaoke musical piece and information for synchronizing the accompaniment and the lyrics of the karaoke musical piece, each said karaoke musical piece having an identifier and a predetermined background selector appended thereto, data storage means for storing said karaoke data transmitted according to a predetermined schedule by way of communication media, and image storing means for storing images with sound supplied via a predetermined channel on a digital multichannel television broadcast according to a predetermined schedule, wherein when a request is made to play back a karaoke musical piece, karaoke data for said requested karaoke musical piece is read out from said data storage means and the sound of an accompaniment and the lyrics text of said karaoke musical piece in said karaoke data with the former synchronized to the latter are played back to be output via said acoustic output means and said image outputting means, respectively, when a request is made to play back a karaoke musical piece, said background selector of said karaoke data read out from said data storage means is picked up and supplied to a background processing means, said background processing means selects a channel on said digital multichannel television broadcast on which the images associated with said background selector are broadcasted, to supply said images on the selected channel to said image outputting means, and said images with sound stored in said image storing means are read out and output via said acoustic output means and said image outputting means when predetermined conditions are established.

2. The apparatus of claim 1 wherein said images with sound broadcasted on the predetermined channel includes a plurality of video programs.

3. The apparatus of claim 2 wherein said video programs include PR videos, advertisements and video clips.

4. The apparatus of claim 2 wherein each of said video programs contains an information identifying an image type thereof corresponding to said background selector.

5. The apparatus of claim 1 wherein said images with sound stored in said image storing means are read out and played back through said acoustic output means and said image outputting means when no karaoke piece of music is to be played back.

6. The apparatus of claim 1 wherein said background selectors of karaoke musical pieces which were recently selected and performed are examined in order to select images representative of preference of karaoke customers.

7. The apparatus of claim 1 wherein said digital multi-channel television broadcast is a satellite broadcast.

8. The apparatus of claim 1 further comprising a receiver of said digital multichannel television broadcast.

9. A karaoke playback system utilizing two kinds of media of both communication and broadcasting, comprising a plurality of karaoke playback apparatuses, each said karaoke apparatus comprising acoustic output means for outputting sound of an accompaniment of a karaoke musical piece and image outputting means for displaying images as a background image to which character strings representing lyrics text of said karaoke musical piece are added, karaoke data containing digital data which includes information of both an accompaniment and lyrics of a karaoke musical piece and information for synchronizing the accompaniment and the lyrics of the karaoke musical piece, each said karaoke musical piece having an identifier and a predetermined background selector appended thereto, data storage means for storing said karaoke data transmitted according to a predetermined schedule by way of communication media, and image storing means for storing images with sound supplied via a predetermined channel on a digital multichannel television broadcast according to a predetermined schedule, wherein when a request is made to play back a karaoke musical piece, karaoke data for said requested karaoke musical piece is read out from said data storage means and the sound of an accompaniment and the lyrics text of said karaoke musical piece in said karaoke data with the former synchronized to the latter are played back to be output via said acoustic output means and said image outputting means, respectively, when a request is made to play back a karaoke musical piece, said background selector of said karaoke data read out from said data storage means is picked up and supplied to a background processing means, said background processing means selects a channel of said digital multichannel television broadcast on which images associated with said background selector are broadcasted, to supply said images on a selected channel to said image outputting means, and a common receiving facility comprising a plurality of receivers for receiving different channels of said digital multichannel television broadcast respectively, wherein images on said channels received by said common receiving facility are distributed to said karaoke playback apparatuses, one of said channels is selected to choose images by said background processing means employed in each of said karaoke playback apparatuses, and said images with sound stored in said image storing means are read out and output via said acoustic output means and said image outputting means when predetermined conditions are established.

10. The apparatus of claim 9 wherein said images with sound broadcasted on the predetermined channel includes a plurality of video programs.

11. The apparatus of claim 10 wherein said video programs include PR videos, advertisements and video clips.

12. The apparatus of claim 10 wherein each of said video programs contains an information identifying an image type thereof corresponding to said background selector.

13. The apparatus of claim 9 wherein said images with sound stored in said image storing means are read out and played back through said acoustic output means and said image outputting means when no karaoke piece of music is to be played back.

14. The apparatus of claim 9 wherein said background selectors of karaoke musical pieces which were recently selected and performed are examined in order to select images representative of preference of karaoke customers.

15. The apparatus of claim 9 wherein said digital multichannel television broadcast is a satellite broadcast.

16. A karaoke playback apparatus utilizing two kinds of media of communication and broadcasting, comprising a data memory for storing karaoke data transmitted via a communication network, said karaoke data containing digital data including information of both an accompaniment and lyrics of a karaoke musical piece and information for synchronizing the accompaniment and the lyrics of the karaoke musical piece, a sound processor for generating audio signal of an accompaniment sound according to the accompaniment sound data of the karaoke data read out from said data memory to be output via a speaker, an image processor for controlling display of the lyrics data contained in the karaoke data in synchronism with processing of the accompaniment sound to be displayed via a monitor, a receiver of a digital multichannel television broadcast for receiving a plurality of channels on which background images for karaoke musical pieces are broadcasted, a background controller for controlling said receiver of the digital multichannel television broadcast, and an image storage unit for storing said video programs supplied via said digital multichannel television broadcast according to a predetermined schedule, wherein each said karaoke musical piece has an identifier and a predetermined background selector appended thereto, at least one of said channels of the digital multichannel television broadcast providing a plurality of video programs each of which has the contents associated with either of said background selectors, when a request is made to play back a karaoke musical piece, karaoke data for said requested karaoke musical piece is read out from said data memory and the sound of an accompaniment and the lyrics text of said karaoke musical piece in said karaoke data with the former synchronized to the latter are played back to be output via speaker and said monitor, respectively, while the lyrics are synchronized with the accompaniment, when a request is made to play back a karaoke musical piece, said background selector of said karaoke data read out from said data memory is picked up and supplied to said background controller, said background controller selects a channel from said digital multichannel television broadcast on which images associated with said background selector are broadcasted to supply said images on the selected channel to said monitor, and said video programs stored in said image storage unit are read out and output via said speaker and monitor when predetermined conditions are established.

17. The apparatus of claim 16 wherein said video programs stored in said image storage unit are read out and played back through said speaker and said monitor when no karaoke piece of music is to be played back.

18. The apparatus of claim 16 wherein said video programs include PR videos, advertisements and video clips.

19. The apparatus of claim 16 wherein said background selectors of karaoke musical pieces which were recently selected and performed are examined in order to select images representative of preference of karaoke customers.

20. The apparatus of claim 16 wherein said digital multichannel television broadcast is a satellite broadcast.

* * * * *